Figure 1:
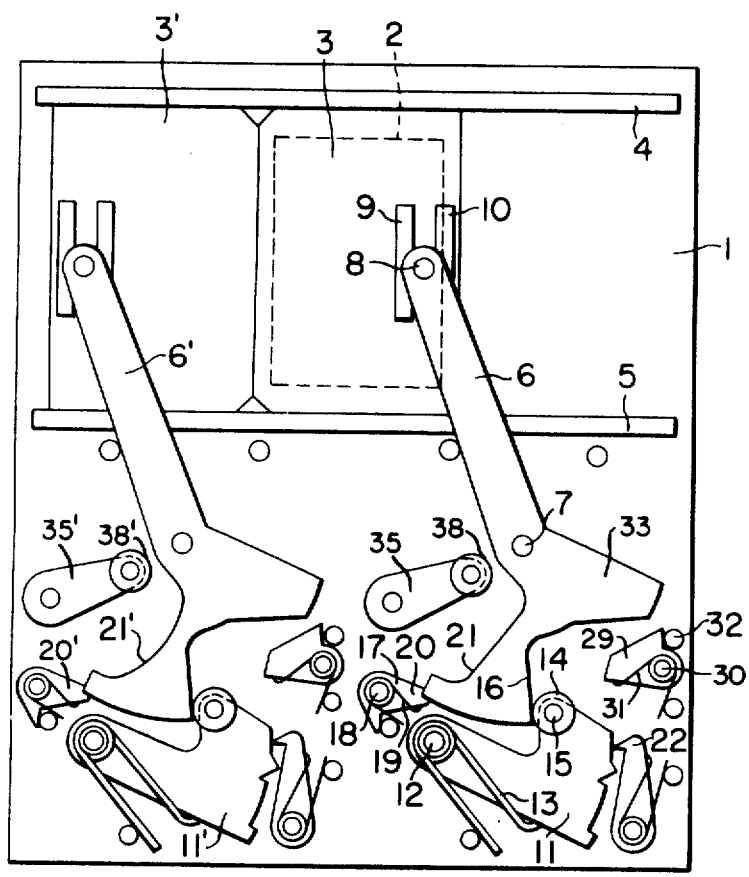

United States Patent
Yamada

[15] 3,672,282
[45] June 27, 1972

[54] DEVICE FOR DRIVING CAMERA SHUTTER CURTAINS

[72] Inventor: Takeo Yamada, Tokyo, Japan
[73] Assignee: Nippon Kogaku K.K., Tokyo, Japan
[22] Filed: Jan. 16, 1970
[21] Appl. No.: 3,336

[30] Foreign Application Priority Data
Jan. 30, 1969 Japan....................................44/6297

[52] U.S. Cl. .............................................................95/57
[51] Int. Cl. ..........................................................G03b 9/42
[58] Field of Search ...........................................95/57, 63

[56] References Cited
UNITED STATES PATENTS

| | | | |
|---|---|---|---|
| 3,099,196 | 7/1963 | Neubert | 95/63 |
| 2,925,763 | 2/1960 | Hill-Venning | 95/63 |
| 2,463,206 | 3/1949 | Robertson | 95/63 |

Primary Examiner—Samuel S. Matthews
Assistant Examiner—Michael L. Gellner
Attorney—Ward, McElhannon, Brooks & Fitzpatrick

[57] ABSTRACT

The working energy discharged by a driving spring for accelerating the shutter curtains and their associated moving members is mostly recovered by said springs during the deceleration stage for using the recovered energy for the next acceleration operation. The work required for the shutter charging is extremely reduced, while the shutter curtain travelling time is rather shortened.

3 Claims, 6 Drawing Figures

FIG. 6
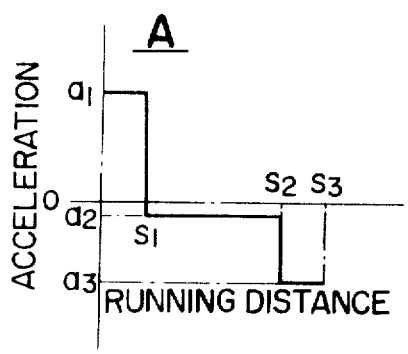
A
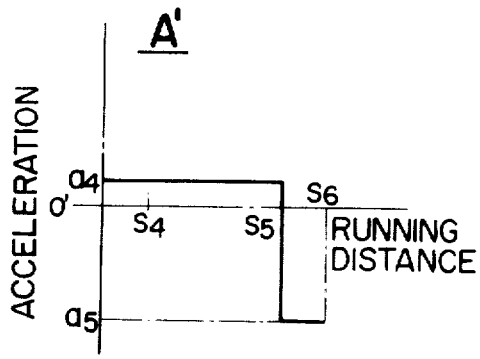
A'
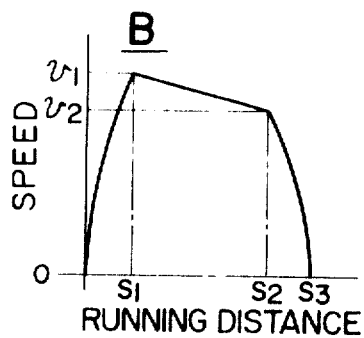
B
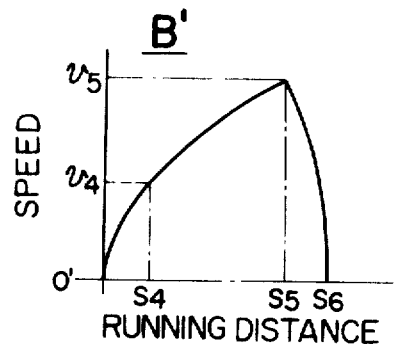
B'
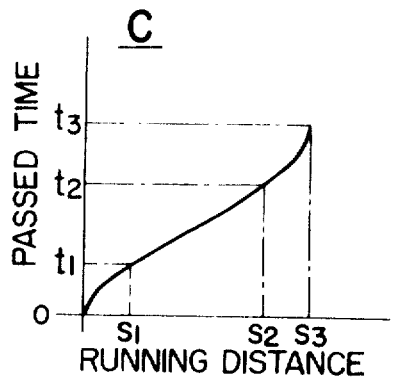
C
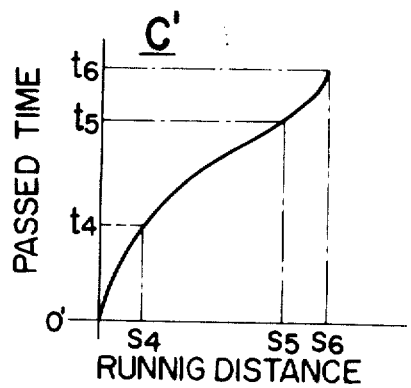
C'

DEVICE FOR DRIVING CAMERA SHUTTER CURTAINS

The present invention relates to a camera shutter curtain driving device and on one particularly to a focal plane shutter for a camera.

In the conventional camera shutter curtain driving device, the kinetic energy of the curtains, the levers and other moving members should generally be absorbed by brake means or the like in order to stop the accelerated shutter curtains at the end of its traveling stroke. In the other device, the shutter curtains, which impact against the stopper means and are bounded, are restrained by a locking device at the termination of movement of the shutter curtain. In case, the accelerated travelling motion of the shutter curtains is converted into the vibrations and then is transformed into the friction which in turn converts the kinetic energy into the heat, which is dissipated to the exterior. Therefore, the variation of the coefficients of friction of various moving members are inevitably caused due to the oxidation of members, and the flow out, voltarization, oxidation, polymerization, and other chemical changes of the lubricant and so on, so that the uniform movement of the shutter curtains is not ensured, thereby causing the decrease in the accuracy of the movement of the shutter curtains or the rebounding thereof.

In accordance with the present invention, the kinetic energy of the accelerated shutter curtains and its associated moving members is mostly received in their deceleration so that the recovered energy is used again for the next acceleration operation. Therefore, the work which is required when the shutter mechanism is wound or charged may be extremely reduced as compared with the conventional device because the work is reduced to only work required for shutter mechanism winding and running against the resistance or frictional forces of the moving parts.

Furthermore, according to the present invention, the amount of the deceleration work is almost not affected by the variation of the coefficients of friction of the moving parts, so that the accuracy of the movement of shutter curtains may be much improved.

According to illustrative embodiments of the present invention, the inertia travelling stroke is provided between the acceleration and deceleration strokes so that the time required for the shutter crutain travelling can be reduced as compared with the conventional device of this type even under the same conditions of the travel distance and the maximum speed, that is under the same acceleration work.

It is therefore an object of the present invention to provide a camera shutter drive device and more particularly a focal plane shutter driving device, in which firstly, the work which is consumed for operation of the shutter driving mechanism is reduced as compared with the conventional device, and secondly, the time between the shutter curtain having a predetermined mass begins to open and finishes to open the aperture, or the time between the shutter curtain beings to close and finishes to close the aperture is made shorter than that of the conventional system and obtains high speed shutter, even though the work which is consumed in the above mentioned motion is less than that required for the conventional device.

The above and other objects, features and advantages of the present invention will become more apparent from the following description of illustrative embodiments thereof with reference to the accompanying drawing, in which:

FIGS. 1 to 5 are plan views of one embodiment of the present invention showing its various positions in operation; and FIG. 6 are graphs for explanation about the present invention and the conventioned device.

A first embodiment of the present invention will be described with reference to FIGS. 1 to 5 illustrating the plan views of various states of the curtain driving device in accordance with the present invention. FIG. 1 shows the charged state. A base plate 1 has an aperture 2 and a first and second curtains 3 and 3' are adapted to travel along guides 4 and 5 so as to open and close the aperture 2. A lever 6 adapted to drive the first curtain 3 is pivotably fixed to the base plate 1 by use of a pivot 7 and has a pin 8 extended from one end thereof and interposed between a pair of guides 9 and 10 fixed to the first curtain 3. Upon rotations of the lever 6, the first curtain 3 is permitted to travel. A segment 11 is pivotably fixed to the base plate 1 by means of a pivot 12 and is normally biased so as to rotate in the counterclockwise direction by means of a drive spring 13. A roller 14 is rotatably fixed to the segment 11 by means of a pivot 15 and is pressed against an acceleration cam portion 16 of the lever 6 so as to rotate the lever 6 in the clockwise direction. A key 17 is pivotably carried by a pivot 18 and is biased so as to rotate in the counterclockwise direction by means of a spring 19 so that one end of the key 17 is in engagement with the lever 6, thereby retaining the first curtain 3 at its starting position. A second curtain lever 6' is similar to the lever 6 except the winding cam portion 21' of the lever 6'. The members 11' and 20' are similar to those 11 and 20 respectively.

Figure 2:
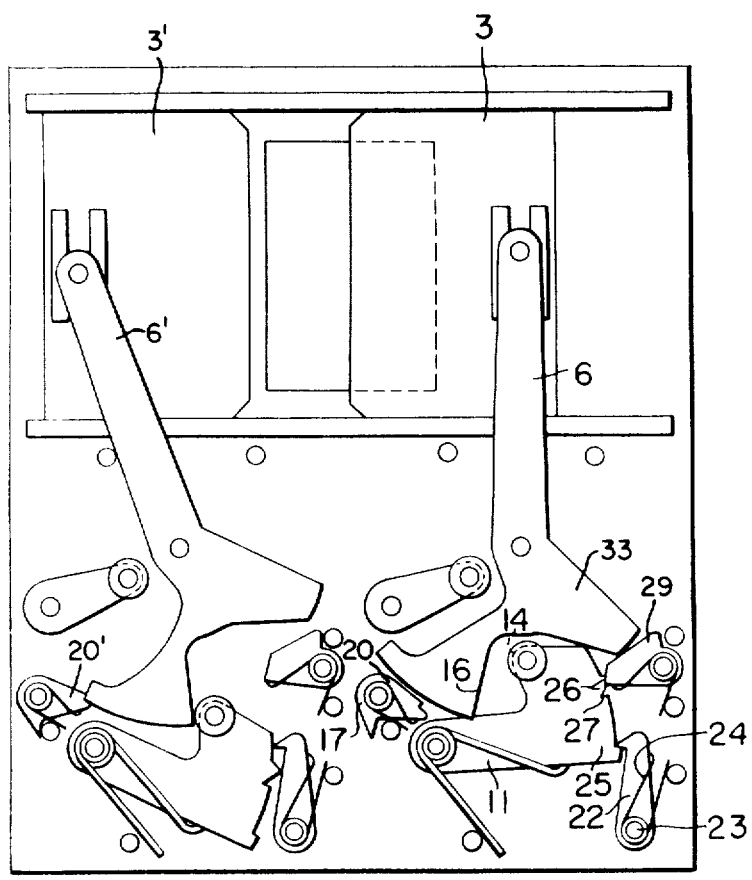

FIG. 2 shows the state where the first curtain 3, after start, got at the half way of its travel. When the key 17 is rotated by a control mechanism (not shown) so that the key 17 is released from the lever 6, and the roller 14 presses the acceleration cam portion 16 of the lever 6, thereby rotating the latter in the clockwise direction and accelerating the same. In this case, the hook portion of a pawl 22 which is pivoted to a pivot 23 and biased so as to rotate in the counterclockwise direction by means of a spring 24 engages with a stepped portion 25 of the segment 11 so that the latter is retained in the position shown in FIG. 2. Thus, the roller 14 stops pressing the acceleration cam portion 16 so that the acceleration of the lever 6 comes to an end. Thereafter, the first curtain 3 and the lever 6 continue their movements by their own inertia and become the positions shown in FIG.2.

During the change from the state shown in FIG. 2, the hook portion of the pawl 22 passes over the projected portion 26 and the recessed portion 27 of the segment 11, but the moment of inertia of the pawl 22 and the torque of the spring 24 acting upon the pawl 22 are so selected that the pawl 22 is bounced at the projected portion 26 so as to jump over the recessed portion 27 and then engaged with the rear stepped portion 25 of the segment 11.

Figure 3:
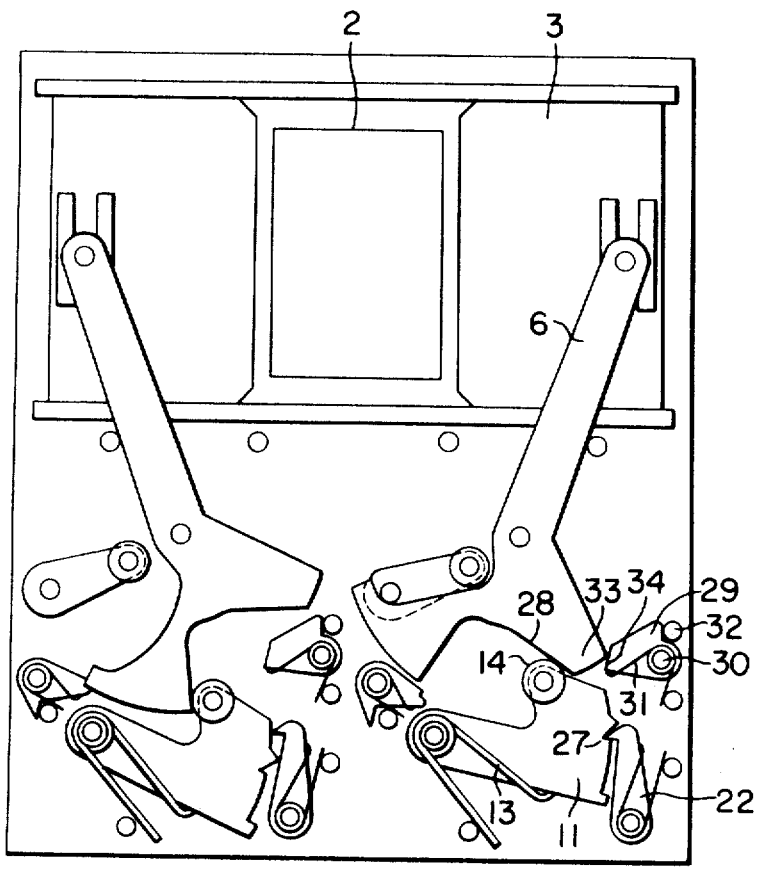

FIG. 3 shows the first curtain 3 reaching the end of its travel so that the aperture 2 is completely opened. From the position shown in FIG. 2, the first curtain 3 and the lever 6 continue their movements by their inertia and the roller 14 is pressed against the deceleration cam portion 28 of the lever 6 so that the segment 11 is rotated in the clockwise direction, whereby the spring 13 is loaded against its torque. Thus the kinetic energy which is captured from the spring 13 during the acceleration stage is returned to the spring 13 except those lost due to the frictional resistances of various components, so that the velocity of the first curtain 3 and the lever 6 are lost, whereby they are stopped at the positions shown in FIG. 3, in this case, the hook portion of the pawl 22 engages with the recessed portion 27 of the segment 11 so that the latter is retained in the position shown in FIG. 3, thereby preventing the reverse rotation of the lever 6.

A detent 29 is pivotably fixed to the base by means of a pivot 30 and is normally baised so as to rotate in the clockwise direction by a spring 31. In FIG. 1, the detent 29 is retained in position by means of a pin 32 and during the time when the first curtain 3 travels from its stationary position shown in FIG. 1 to the final position shown in FIG. 3, the end 33 of the lever 6 engages with the detent 29 to rotate the latter against the spring 31 as shown in FIG. 2 and then is held between the roller 14 and the sloping end 34 of the detent 29 when the first curtain 3 comes into its final position in cooperation with the lever 6 and the detent is returned in its initial position by the spring 31. In this case, it is noted that the work required for the rotation of the detent 29 is given from the lever 6 and then returned thereto except the work lost as frictional resistance and becomes zero.

Figure 4:
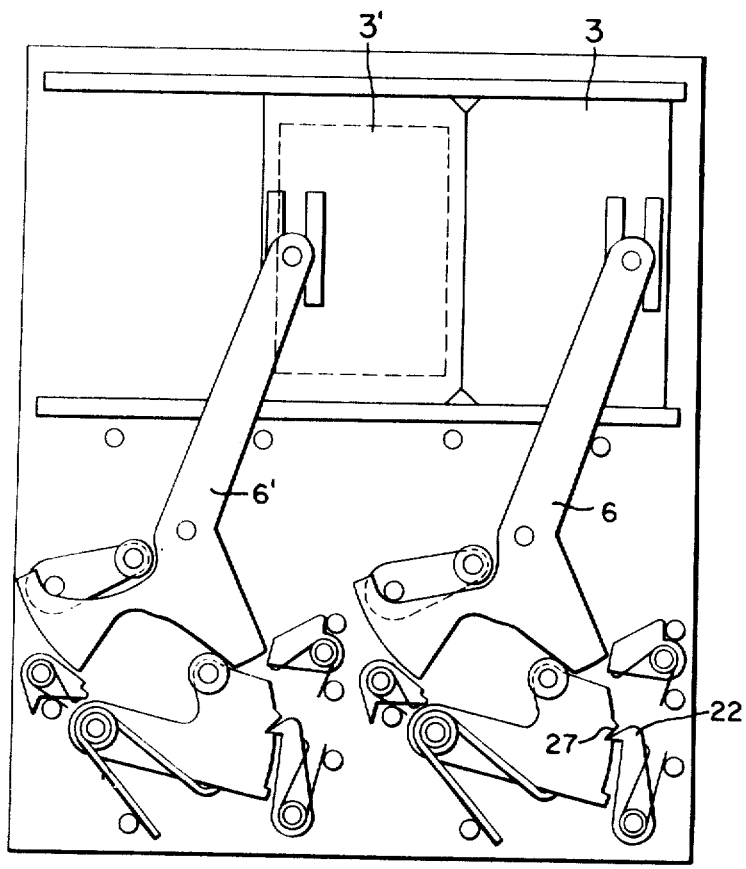
Figure 5:
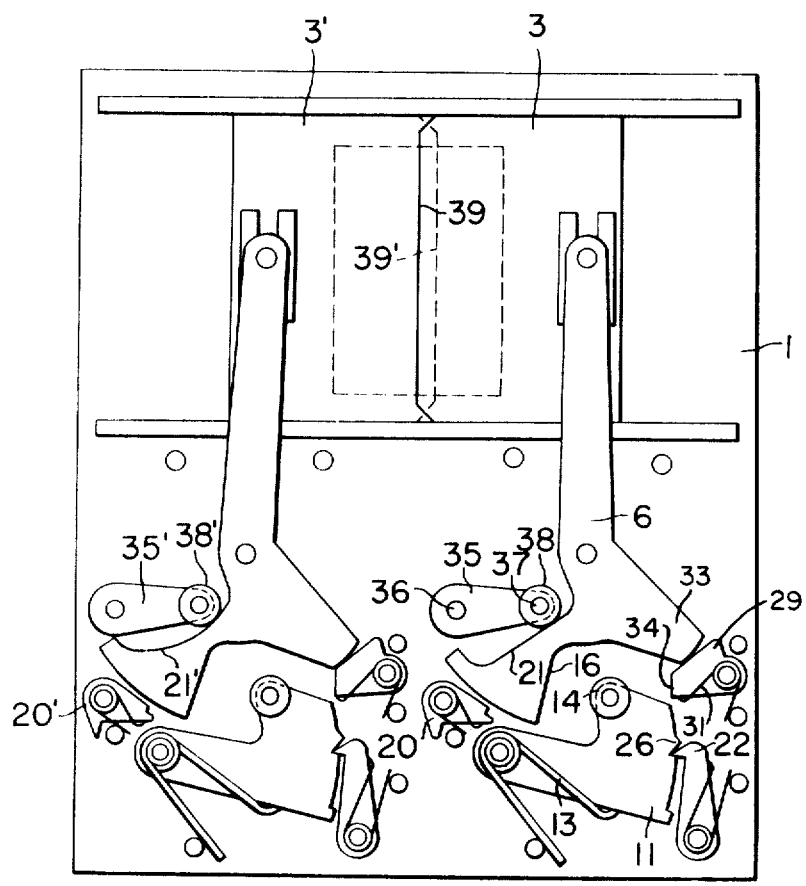

FIG. 4 shows that the second curtain 3' closes the aperture 2 after travelling in the similar manner as the first curtain 3. FIG. 5 shows that the shutter is being charged. A first curtain charging lever 35 is pivotably fixed to the base plate 1 by means of a pivot 36 and is rotated in the clockwise direction together with a second curtain charging lever 35' similar to the lever 35 while maintaining a predetermined angular relation (or phase) therebetween by means of an interlocking mechanism (not shown). A roller 38 pivotably fixed to the lever 35 by means of a pivot 37 is adapted to be pressed against the charging or winding cam portion 21 of the lever 6, thereby rotating the latter in the counterclockwise direction so as to move the first curtain 3 to the left. In this case, the sloping end 34 of the detent 29 is pressed upon by the end 33 of the lever 6 so that the detent 29 is rotated in a counterclockwise direction against the spring 31. The second curtain 3' is also moved to the left in the similar manner as described above, but the contours of the charging cam portions 21 and 21' are different from each other and are so selected that the edge 39 of the first curtain 3 and the edge 39' of the second curtain are overlapped when they pass over the aperture 2. Therefore, the leakage of light during the shutter charging may be prevented. But at the beginning and end of the shutter charging process, they are not overlapped but are maintained in abutment relation with each other.

The segment 11 is retained in position by means of the pawl 22, but when the lever 6 is rotated for shutter charging so that the acceleration cam portion 16 of the lever 6 is pressed against the roller 14, the segment 11 is caused to rotate in the clockwise direction so that the extended or projected portion 26 thereof presses the pawl 22 and simultaneously the drive spring 13 charged against its torque. Thus, the segment 11 is returned to its initial position shown in FIG. 1.

Thereafter, the charging or winding levers 35 and 35' are returned to their initial positions shown in FIG. 1 by means of an interlocking mechanism not shown. The keys 20 and 20' are also returned in their initial positions shown in FIG. 1. Thus, all of the components are returned to their initial positions.

From the foregoing, it is seen that the most part of the kinetic energy which is possessed by the accelerated curtain and the lever and so on may be recovered during the deceleration thereof and then may be used again for acceleration thereof, so that work required for the shutter charging or winding may be extremely reduced and the movement of the curtain with a higher degree of accuracy may be ensured.

Furthermore, according to the present invention, the curtain travelling time may be reduced as compared with the conventional device under the same conditions of the travel distance and, the maximum speed, that is under the same acceleration work, This will be described in more detail with reference to FIG. 6. FIG. 6–A, B and C graphically show the motion of the device in accordance with the present invention and FIGS. 6–A', B' and C' the motion of the conventional device. In both cases, the distance of travel of the curtain, the position of the aperture, the masses of the curtains and their associated components and the acceleration work are taken, same. The curtain travel distance is plotted against the horizontal axis with the point of origin being the starting point.

In FIG. 6–A, $a_1$ is an acceleration of the curtain produced by the drive spring; $s_1$, the position of the first side edge of the aperture and also of the end of the acceleration stroke; and $s_2$, the position of the second side edge of the aperture and also of the starting point of the deceleration stroke. Therefore, the distance $(s_1 - s_2)$ is the width of the aperture and the inertia traveling stroke. Reference character $a_2$ designates the negative acceleration caused by the friction and so on; and $a_3$, the negative acceleration caused substantially when the drive spring is charged again by the inertia of the curtain and other components. The distance $(s_2 - s_3)$ is the deceleration stroke and $s_3$ designates the stop position. In FIG. 6–A', $a_4$, the acceleration; $s_4$ and $s_5$, the positions of the side edges of the aperture; $s_5$, the acceleration end position and also the deceleration starting position; $(s_5 - s_6)$, the deceleration stroke; and $a_6$, the negative acceleration caused by the braking and the like.

In FIG. 6–B, it is seen that the velocity $V_1$ becomes maximum at $s_1$ and becomes $V_2$ at $s_2$. In FIG. 10–B', the velocity becomes $V_4$ at $s_4$ and $V_5$ at $s_5$ which is the maximum velocity.

In FIG. 6–C, the relationship between the time and the distance is shown. The time required for the curtain edge reaching the point $s_1$ from its starting position is $t_1$; the time reaching the point $s_2$, $t_2$ and the time reaching the point $s_3$, $t_3$. In FIG. 6–C, the times reaching the points $s_4$, $s_5$ and $s_6$ are $t_4$, $t_5$ and $t_6$ respectively. Make that in both cases, the masses of the blinds and the components are m and the work required for reaching the same acceleration is same.

Then, $ma_1 s_1 = ma_4 s_4$

The work required for deceleration is:
$$ma_2(s_2 - s_1) + ma_3(s_3 - s_2) = ma_5(s_6 - s_5)$$
and
$$|Ma_1 s_1| = |ma_5(s_6 - s_5)|$$

Since
$$s_1 = s_4 = s_3 - s_2 = s_6 - s_5,$$
therefore,
$$|a_1| = a_5 > |a_3| > |a_4| > |a_2|$$
Hence,
$$V_1 = V_5 > V_2 > V_4, \text{ and } V_2^2 - V_1^2 = 2a_2(S_2 - S_1)$$
$$V_5^2 - V_4^2 = 2a_4(s_5 - s_4)$$

Therefore, the difference between the times required for the edges of the curtains passing over the aperture is $$(t_5 - t_4) - (t_2 - t_1) = \frac{V_5 - V_4}{a_4} - \frac{V_2 - V_1}{a_2}$$

$$= \frac{2a_4(s_5 - s_4)}{a_4(V_5 + V_4)} - \frac{2a_2(s_2 - s_1)}{a_2(V_2 + V_1)}$$

$$= \frac{2(s_5 - s_4)}{V_5 + V_4} - \frac{2(s_2 - s_1)}{V_2 + V_1}$$

and $$(s_5 - s_4) = (s_2 - s_1) \text{ and } V_5 + V_4 < V_2 + V_1$$

Hence, $$(t_5 - t_4) - (t_2 - t_1) > 0$$

This means that the edge of the curtain driven in accordance with the present invention can pass over the aperture at a time less than that required for the conventional device. Furthermore, the time $t_3$ is shorter than time $t_6$, which indicates that the time required for the device of the present invention travelling the whole distance is much sorter than that of the conventional device.

What is claimed is:

1. A focal plane shutter for a camera comprising an exposure aperture, a first shutter member and a second shutter member, means mounting each of said shutter members for movement along a path to open and close said aperture,
   and first and second means for separately actuating said respective shutter members to effect high speed exposure;
   each of said actuating means comprising
   a. an operating lever connected to said shutter member and moved therewith;
   b. a main spring for storing shutter driving energy;
   c. means for transferring said driving energy to said operating lever to accelerate said shutter member rapidly to its final velocity during movement along a first portion of said path;
   d. means for terminating actuation of said energy transferring means during movement of said shutter member along the remaining portion of said path;

e. means for controlling said operating lever to decelerate said shutter member to zero velocity while charging said main spring with a part of the kinetic energy of said shutter member during movement along said remaining portion of said path; and f. a shutter charging lever operable by hand for moving said operating lever to its starting position.

2. A focal plane shutter according to claim 1, wherein said energy transferring means includes a pivotable lever biased by said main spring and a roller provided on said pivotable lever; said operating lever having a first arm connected to said shutter member, a second arm engageable with said roller during movement of said shutter member over said said first portion of said path to accelerate said shutter member and a third arm engageable with said roller against said main spring during movement of said shutter member over said remaining portion of said path to decelerate said shutter member.

3. A focal plane shutter according to claim 2, wherein said actuation terminating means includes a detent pawl biased toward said pivotable lever and first and second detents formed on said pivotable lever;

the first detent engaging said detent pawl when said second arm disengages said roller, the second detent engaging said detent pawl after said pivoted lever has been moved by said third arm.

* * * * *